United States Patent [19]

Frawley et al.

[11] Patent Number: 5,433,861

[45] Date of Patent: Jul. 18, 1995

[54] PERMANENT DEFORMATION AND USE OF SULFONATED HALOPOLYMER ARTICLES

[75] Inventors: Nile N. Frawley; Steven R. Erskine, both of Midland, Mich.

[73] Assignee: The Dow Chemical Company, Midland, Mich.

[21] Appl. No.: 123,487

[22] Filed: Sep. 17, 1993

[51] Int. Cl.$^6$ .............................................. B01D 61/00
[52] U.S. Cl. ................................. 210/654; 210/651; 210/653; 210/450; 210/500.23; 210/500.36; 264/233; 264/343; 428/421
[58] Field of Search .................. 264/233, 343; 210/500.36, 450, 651, 653, 654, 263; 428/421

[56] References Cited

U.S. PATENT DOCUMENTS

| | | | |
|---|---|---|---|
| 3,282,875 | 11/1966 | Connolly et al. | 260/29.6 |
| 3,560,568 | 2/1971 | Resnick et al. | 260/513 |
| 3,735,558 | 5/1973 | Skarstrom et al. | |
| 4,025,405 | 5/1977 | Dotson et al. | 204/98 |
| 4,065,366 | 12/1977 | Oda et al. | 204/98 |
| 4,112,151 | 9/1978 | Cooke | 264/343 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,178,218 | 12/1979 | Seko | 204/98 |
| 4,270,996 | 6/1981 | Suhara et al. | 204/98 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,417,969 | 11/1983 | Ezzell et al. | 204/252 |
| 4,462,877 | 7/1984 | Ezzell et al. | 204/98 |
| 4,465,533 | 8/1984 | Covitch | 264/343 |
| 4,470,889 | 9/1984 | Ezzell et al. | 204/98 |
| 4,478,695 | 10/1984 | Ezzell et al. | 204/98 |
| 4,751,004 | 6/1988 | Stevens et al. | 210/659 |
| 4,764,320 | 8/1988 | Chau et al. | 264/343 |
| 4,846,977 | 7/1989 | DeVellis et al. | 210/640 |

FOREIGN PATENT DOCUMENTS 1440963  5/1973  United Kingdom.

OTHER PUBLICATIONS

Moore et al., "Barriers to Flow in Semicrystalline Ionomers,", J. Membrane Science, 75(1992)7–14.
Yeo, "Dual Cohesive Energy Densities of Perfluorosulphonic Acid (Nafion) Membrane", Polymer, 1980. vol. 21, Apr. pp. 432≧435.

Primary Examiner—Robert A. Dawson
Assistant Examiner—Ana M. Fortuna
Attorney, Agent, or Firm—John B. Treangen

[57] ABSTRACT

This invention relates to the preparation of, and a device for using, a permanently deformed sulfonated halopolymer article. A flexible and non-brittle flange may be formed from at least one end of a hollow perfluorosulfonic acid membrane in one aspect of the invention. The flanged membrane is particularly useful for quick attachment and detachment to various instrumentation used for pervaporation. In addition, by packing the membrane with a means for increasing radial diffusion of fluid within the membrane, pervaporation efficiency may be increased.

11 Claims, No Drawings

PERMANENT DEFORMATION AND USE OF SULFONATED HALOPOLYMER ARTICLES

This invention relates to the following: a method of permanently deforming a sulfonated halopolymer article; an improved device that has a sulfonated halopolymer article sealed to it by means of a permanent, functionally deformed seal that is formed from, and is an integral part of, the article; and a method for separating at Least one polar liquid from at least one non-polar liquid.

BACKGROUND OF THE INVENTION

In many processes, two or more liquids come into contact with one another. Azeotropes of these liquids may form and simple separation methods are often inadequate to completely separate the liquids. This can cause significant problems in a variety of chemical or measurement processes. For example, the presence of water can cause: interferences associated with measurements using infrared (IR) or Nuclear Magnetic Resonance (NMR) spectroscopy; increases in corrosion rates in metalst or deactivation of catalysts in manufacturing processes. Certain portions of conventional processes, such as product recovery and reactant or solvent recycling, require separation of the liquids. Some separation methods commonly used are distillation, the use of dessicants, and the use of molecular sieves. However, these and other separation methods often have limited efficiency, require complex and costly equipment, or involve several processing steps.

Pervaporation, a process of selective permeation through a membrane and subsequent evaporation, is quite popular for use in separating and purifying liquids and gases. The recent surge in membrane technology has resulted in the availability of numerous polymer materials with an assortment of transport properties. Some of the more frequently used materials are sulfonated halopolymers, or metal salts thereof. A common sulfonated halopolymer is a polymer of perfluorosulfonic acid (PFSA). Examples of such polymers, and methods of preparing such polymers, can be found in the following U.S. Pat. Nos. that are incorporated herein by reference: U.S. Pat. Nos. 3,282,875; 3,560,568; 4,025,405; 4,116,888; 4,123,336; 4,126,588; 4,178,218; 4,209,635; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695. See also T. D. Sierke, "Perfluorinated ionomer Membranes", ACS Symposium Series No. 180, pp. 386–88 (1982). For a discussion of the most commonly preferred embodiments of PFSA polymers, See De Veilis et al., U.S. Pat. No. 4,846,977, col. 5, lines 1-36 (incorporated herein by reference).

Pervaporation devices, which are based on the selective permeation of mixture components through permselective membranes, have been developed and modified for use in many different applications. For purposes of this invention, "pervaporation device" and "permeation device" are used interchangeably to mean the same thing. Skarstrom et al. (U.S. Pat. No. 3,735,558), for example, disclose a process and apparatus for separating selected or key components from mixed fluid feeds using a PFSA membrane. They employ a combination of pressure and concentration gradients in a continuous process to achieve this purpose. More specifically, they create both a pressure difference and a composition difference between two counter-currently flowing fluid streams separated by the walls of a hollow PFSA membrane. These pressure and composition differences are also referred to as pressure gradients and concentration gradients. They act as driving forces to induce select or permeable fluid components of the feed to flow from a high pressure region that contains feed, through semi-permeable walls of the PFSA membrane to a low pressure region that contains either reflux, purge fluid, or both, thereby substantially removing selected permeable fluid components from the feed.

Another pervaporation method and device are disclosed by De Vellis et al. in U.S. Pat. No. 4,846,977, the teachings of which are incorporated herein by reference. A mixture comprising one or more polar liquids and one or more non-polar liquids is placed in contact with one side of a membrane comprising a polymer of a PFSA, or metal salt thereof. On the other side of the membrane, conditions are provided such that polar liquids which have permeated through the membrane are carried away from the membrane. This is done by providing either a desiccant, a vacuum and purge gas, or both. Both the non-polar liquids and the fluid desiccant containing the permeated polar liquids are then separately removed from the vicinity of the membrane. Although this method and device function well, it would still be desirable to increase their efficiency.

In relation to a liquid chromatography method and apparatus, Stevens et al. (U.S. Pat. No. 4,751,004) disclose an improved flow-through reactor in which the improvement comprises a combination of a packing means and a membrane. They teach that packing an ion exchange membrane or membrane channel, used for ion chromatography, with inert or charged ion exchange beads increases overall suppressor efficiency. They use "suppressor efficiency" to refer specifically to the efficiency of reactions that are distinctive to ion chromatography. In these reactionst an electrolyte eluent is converted to a weakly ionized form in order to sensitively detect sample ions in a low conductive background. They attribute the increase in efficiency to the mixing action of the packing on ionic solute as it flows through the membrane channels, resulting in a reduction in laminar flow of the solute. See col. 7, lines 17–34 (incorporated herein by reference).

In order for an apparatus to properly function as a pervaporation device, though, the membrane must be effectively sealed to the device. Several means of sealing the membranes to pervaporation devices are known. For example, Skarstrom et al., col. 13, lines 20–44, use headers, end seals, and clamps. These sealing components are typically constructed of non-membrane materials such as epoxy resinst polyamide, silicone (siloxane polymers), polyethylene, polypropylene, butyl rubbery neoprene, polyester, or fluorocarbon polymers. De Veilis et al. (U.S. Pat. No. 4,846,977), col. 12, lines 45–50, adhesively pot a PFSA membrane into two lipped epoxy tubesheets. The lip on each one of the potted epoxy tubesheets allows the formation of a seal with a casing face plate. For examples of potting materials, see De Veilis et al., col. 14, lines 44–51, and James C. Davis and Dennis P. Petersony "Hollow Fiber Postcolumn Reactor for Liquid Chromatography," 57 *Anal Chem.* 770 (1985). Other means of sealing include friction fit slip seals and swell seals wherein, typically, an end of the membrane is forced or swelled over a piece of the device.

There are, however, many problems associated with the above described sealing means. For example, many pervaporation device seals cannot withstand pressures suitable for effective permeation process conditions. The seals can also restrict effective flow of the fluid through the membrane. This is especially apparent when a sealing means component that is composed of a material different from the membrane (hereinafter referred to as a non-membrane component) interacts chemically with a solvent. Upon chemical interaction of a solvent and a non-membrane component, the component may swell and eventually rupture the membrane. Sealing means of this type are prone to leaking and typically last only a short time. In addition, many pervaporation device seals are incapable of being changed or modified quickly. It would be desirable to have a sealing means that substantially reduces these above-described problems.

A possible method of sealing a membrane to a pervaporation device would be to permanently and functionally deform the membrane into its desired sealing position with the device. An example of this would be a membrane that is permanently flanged and then functionally fitted to the device. This would not require the solvent-exposed use of non-membrane sealing components. It would also eliminate the use of potting materials. However, attempts to seal sulfonated halopolymer membranes by permanently forming them into their desirable positions have been unsuccessful. Sulfonated halopolymers are generally considered to be incapable of being effectively deformed to a permanent shape because of their elastic properties at room temperature and because thermal decomposition begins before the sulfonated halopolymers become fluid enough for deformation at an elevated temperature. See R. B. Moore et al., "Barriers to Flow in Semicrystalline Ionomers," 75 *J. Membrane Sci.* 8 (1992).

SUMMARY OF THE INVENTION

A first aspect of this invention is a method of permanently deforming a sulfonated halopolymer article comprising: (a) contacting at least a portion of the article with a solvent to swell at least that portion and thereby form a swelled article; (b) deforming at least a part of the swelled portion to form a temporarily deformed article; and (c) heating the swelled portion of the temporarily deformed article to a temperature and for a time sufficient to convert the temporarily deformed article to a permanently deformed article.

A second aspect of this invention is an improved device having a sulfonated halopolymer article that is sealed to the device, the improvement comprising a permanent, functionally deformed sealing means that is formed from, and is an integral part of, the article. This aspect of the invention takes advantage of the permanently deformed article, formed in the first aspect of the invention, to provide an improved device using a functionally deformed sealing means. The permanent, functionally deformed sealing means remains flexible and non-brittle, but is still able to withstand high pressures without leaking. The sealing means may be compression fit to the device. Using this compression fit, swelling of seal components and resulting membrane rupture may be avoided. In addition, the seal is capable of modification or adjustment without undue time delay or expense.

A third aspect of this invention is a method for separating at least one polar liquid from a mixture of polar and non-polar liquids that comprises placing the mixture in contact with a first surface of a sulfonated halopolymer article, the first surface having a packing means positioned thereon, the article also having a second surface that is spaced apart from the first surface, the second surface having a drying means positioned thereon. This aspect of the invention yields increased permeation efficiency and is preferably used in cooperation with the first and second aspects of the invention.

DETAILED DESCRIPTION OF THE INVENTION

For purposes of this invention, "sulfonated halopolymer" refers only to those sulfonated polymers wherein substantially all of the hydrogens have been replaced by halogens and which are of a kind not ordinarily considered to be melt processable. For a discussion of "melt processibility", see R. B. Moore et al., 75 *J. Membrane Sci.* 8 (1992). An example of a sulfonated halopolymer, as described in Ezzell et al. (U.S. Pat. No. 4,337,211), col. 3, lines 18–45 (incorporated herein by reference), is a polymer comprising compounds represented by the general formula:

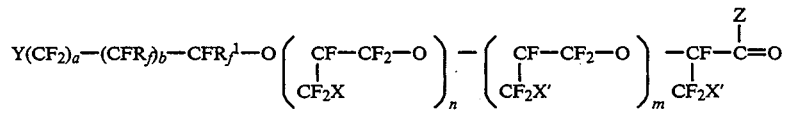

where
a = an integer from, and including, 0 to 3;
b = an integer from, and including, 0 to 3;
m = an integer from, and including, 0 to 6;
n = an integer from, and including, 0 to 6;
$R_f$ and $R_f^1$ are each independently selected from the group consisting of F, Cl, perfluoroalkyl and fluorochloroaklyl;
X = F, Cl, Br, or mixtures thereof when n > 1;
X' = Cl, Br, or mixtures thereof;
Y is selected from the group consisting of

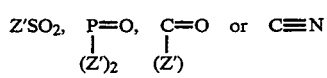

Z' is F, Cl, Br, OH, NRR' or OA;
R and R' are independently selected from the group consisting of hydrogen, an alkyl having one or more than one carbon atom and an aryl;
Z = F, Cl, Br, OH, NRR' or OA;
R and R' are independently selected from the group consisting of hydrogen, an alkyl having one or more carbon atom and aryl;
A = alkali metal, quarterary ammonium or R.

See also Ezzell et al. (U.S. Pat. No. 4.358,545), col. 5, lines 8–42 (incorporated herein by reference). "Sulfonated halopolymers" may also comprise sulfonated fluoropolymers and sulfonated perfluoropolymers, especially the PFSA polymers and salts thereof, disclosed in De Vellis et al. (U.S. Pat. No. 4,846,977), col. 5, lines 1-36 (incorporated herein by reference).

For purposes of this invention, the following definitions also apply:

"articles" include article portions, and comprise membranes and forms thereof;

"permanently deforming" means a method of imparting a deformation that endures for a time period sufficient to perform embodiments of this invention for the useful lifetime of the sulfonated halopolymer article, provided, however, that the method of this invention is not subsequently replicated to impart a new permanent deformation on the permanently deformed article;

"permanent, functionally deformed sealing means" is a means of sealing the article to a device wherein the article is permanently deformed into a shape which, when combined with at least one other part, including the device, functions as an integral part of a seal to the device;

"solvent," when used in relation to swelling of the article, refers to at least one substance capable of swelling the sulfonated halopolymer article;

"molding device" is any device that may be used to impart a desirable shape to a swelled sulfonated halopolymer article;

"polar liquid" refers to a single liquid or to a mixture of two or more polar liquids, wherein the liquid(s) have a dipole moment of about 2, or more;

"non-polar liquid," refers to a single liquid or a mixture of two or more liquids, wherein the liquid(s) have a dipole moment of less than about 2;

"packing means" refers most specifically to particles that are positioned adjacent to a sulfonated halopolymer membrane for the purpose of increasing radial diffusion of a fluid mixture as it passes through the packing means, and which otherwise are not detrimental to the purposes of the invention;

"sealing means" comprises any means by which a sulfonated halopolymer article is connected to another device; and "flexible and non-brittle" means properties which are substantially similar to the flexibility and brittleness of the sulfonated halopolymer article prior to swelling.

In order to permanently deform a sulfonated halopolymer article, at least a portion of the article must first be expanded to a size larger than its original size (swelled). For purposes of this invention, "swelled" and "swollen" are used interchangeably to mean the same thing. Although a preferred amount of swelling depends upon variables such as the size of a specific molding device or the size and thickness of the article that will be permanently deformed, the sulfonated halopolymer article may advantageously be swelled by an amount of from about five percent to about eighty percent over its original size (volume). Undesirable properties may be apparent when the amount of swelling falls substantially outside of this range. For example, if swelling is below about five percent, the article may crack or decompose during deformation and heating. If swelling is above about eighty percent, the article becomes fluid-like and difficult to mold into, and retain, a desirable shape. Typically, the amount of swelling is within a range of from about ten percent to about fifty percent. The range is preferably from about fifteen percent to about thirty percent. In order to obtain the desirable amount of swelling, various factors, such as the following, should be considered: the composition of the sulfonated halopolymer article; the size and thickness of the article portion to be swelled; the means for swelling the article; and the temperature and pressure at the time of swelling.

Although swelling of the article portion may be conducted by other means, the swelling is preferably accomplished by contacting the article portion with a solvent at room temperature and atmospheric pressure. Although other means can be used, the "contacting" is preferably an immersion. The solvent may be either polar or non-polar and may comprise mixtures of more than one solvent. For example, a non-exhaustive list of suitable solvents includes: water, acetonitrile, methanol, ethanol, triethyl amine, diethyl amine, 2-ethyl hexanol, n-amyl alcohol, cyclohexanol, n-butanol, 2-propanol, 1-propanol, ethylene glycol, glycerol, formamide, and tetrahydrofuran (THF). Preferable solvents from this non-exhaustive list include: water, methanol, ethanol, acetonitrile, tetrahydrofuran, or mixtures thereof.

Preferably, the solvent is an aqueous solvent, either water or a mixture of water and any other solvent that is miscible with water as long as the article portion is properly swelled by the solvent. If the solvent is a mixture, preferably at least fifty percent of the mixture is water. For examples advantageous swelling is demonstrated with a solvent mixture of fifty percent acetonitrile and water. Aqueous solvent mixtures, as opposed to some non-aqueous solvents, reduce the potential risk of flammability of the solvent when the article is subsequently heated as described hereinafter.

At least a portion of the article should be placed in contact with the solvent for a time sufficient to impart the appropriate amount of article portion swelling. This time will vary depending upon the factors identified previously. Generally, the time is within a range of from about thirty seconds to about thirty minutes. Typically, no further swelling of the article occurs after thirty minutes of contacting with the solvent. For example, the contact time is preferably between about one minute and about five minutes with a PFSA article that is immersed in a mixture of fifty percent acetonitrile and fifty percent water. Most preferably, the contact time is about two minutes.

Once the article is swelled, the next step is to temporarily deform it. Although any method of temporarily deforming the swelled article may be used, a preferred method is to press at least part of the swelled portion on a molding device that imparts a shape to that part. Molding devices, such as flanging tools, are widely commercially available. For a non-exhaustive list of flanging tool suppliers, see infra "Illustrative Embodiments" section. For the preferred method of deformation, the amount of pressure applied to press the part onto the molding device depends upon the amount of deformation desired. Typically, the greater the amount of pressure that is applied, the greater the deformation obtained. However, the amount of pressure applied is limited by the physical characteristics of the article. For example, generally, the smaller the article size, the smaller the amount of pressure required to obtain the deformation.

The deformation of the article may occur for any amount of time and at any temperature as long as at least a part of the swelled portion is temporarily deformed. However, while the article is temporarily deformed, the swelled portion must be heated to a temperature and for a time sufficient to convert the temporarily deformed article to a permanently deformed article. This may also be referred to as "heat setting." The temperature and time should be sufficient to evaporate off a substantial amount of the solvent from the swelled portion. Typically, a substantial amount of the solvent has been evaporated off when the swelled portion has a volume that is between about two percent to about eight percent greater than its size prior to swelling. The temperature and time, however, should be kept below a level at which the article begins to decompose. In the case of typical PFSA articles, a color change of increasing darkness in the swelled portion may also be apparent as the solvent is being evaporated off. If such color change is noted, it is generally desirable to remove the article from the heat before the article reaches a color substantially darker than the color of the article prior to swelling.

For the preferred method of deformation, the molding device is generally maintained at a temperature within a range of from about 100° C. to about 220° C. Preferably, the range is from about 115° C. to about 175° C. Most preferably, the temperature is about 140° C. Thus, in the most preferred embodiments of this aspect of the invention, the swelled article portion is pressed on a molding device at a temperature of about 140° C., heating the temporarily deformed article to a temperature effective to form a permanently deformed article. For this preferred embodiment, the period of time that the article is pressed on the molding device is between about two and about five seconds, and most preferably, about three seconds.

The method of permanently deforming a sulfonated halopolymer article may also include a subsequent step of cooling at least the heated portion of the permanently deformed article. One method is to press the heated portion of the permanently deformed article on a solid surface having a temperature less than the heated portion. Preferably, the solid surface is at about room temperature (taken as 23° C.). This additional step of pressing the heated portion of the permanently deformed article on a cooler, solid, surface is believed to help the deformed portion maintain its heat set. This additional, subsequent step is typically done for a period of time from about three seconds to about a minute. The period is preferably from about three seconds to about thirty seconds. Most preferably, the period is about five seconds.

A further additional step may be taken wherein at least a portion of the permanently deformed article is placed in contact with a fluid. Preferably, the contact is an immersion and the fluid is water. Although it is not necessary, the fluid is preferably at about room temperature. The permanently deformed article is typically immersed in the fluid for a period of time within a range of from about thirty seconds to about four minutes, preferably about two minutes. This additional step is believed to improve flexibility and reduce brittleness of the portion of the article that has been permanently deformed. By "improve flexibility and reduce brittleness" it is meant that the permanently deformed article will have flexibility and brittleness that is substantially similar to that of the sulfonated halopolymer article prior to the permanent deformation thereof.

A second aspect of this invention is an improved device having a sulfonated halopolymer article that is sealed to the device. The improvement comprises a permanent, functionally deformed sealing means that is formed from, and is an integral part of, the article. The sealing means is desirably secured to the device by way of a compression fitting. A compression fit is typically accomplished by directly abutting the sealing means of the article against the device and using an additional component (e.g. a polypropylene fitting) to surround and secure the sealing means to the device.

One method of fastening a permanently deformed article to a device is to have the permanent, functionally deformed portion of the article be in the shape of a flange and to use a standard flange fitting as the compression fitting. For example, an Upchurch Scientific flange fitting (part number p-402) may be used for a 1 millimeter (mm) (0.039 inch) outer diameter (o.d.) hollow membrane. The flange fitting and a washer that closely matches the o.d. of the hollow membrane are placed over the hollow membrane with the hollow membrane passing through the bore of each. The end of the hollow membrane is squared off and the membrane is permanently deformed into a flange shape by using a nipple shaped flanging tool as a molding device and following the procedure discussed previously for the first aspect of this invention. Using the flange fitting, the flanged hollow membrane may then be compression fit to a cooperating piece of the device, thereby providing a sealed communication between the bore of the hollow membrane and the device.

The flanged, compression fit, sulfonated halopolymer hollow membrane forms a seal with the device that is flexible and non-brittle. The seal may also be attached, detached, or modified without undue time or expense. The seal is strong and can withstand high pressures. By "withstand high pressures", it is meant that the seal will not leak or burst at pressures up to at least the pressures that the rest of the sulfonated halopolymer article can withstand before bursting. For example, a typical flanged, compression fit, seal for a one millimeter (mm) hollow PFSA membrane, being used for pervaporation of water from a liquid chloroform solvent, can effectively withstand internal pressures of at least forty atmospheres (4.05 MPa) without leaking. In addition, the compression fit seal does not expose materials other than the PFSA membrane to solvents that are flowed through the membrane. Thus, the seal will not rupture or radially constrict the membrane by swelling or decomposing after exposure to the solvents.

A third aspect of the present invention is a method for separating at least one polar liquid from a mixture of polar and non-polar liquids. The method comprises placing the mixture in contact with a sulfonated halopolymer article surface that has a packing means positioned thereon. Situated on an opposite side of the surface having a packing means is a surface having a drying means positioned thereon. Preferred polar liquids include water and $C_{1-3}$ alcohols, the more preferred being water. Preferred non-polar liquids are halocarbons, hydrocarbons, organic and inorganic acids, ketones, ethers, higher alcohols, aldehydes, and esters. Preferred higher alcohols are $C_4$ or above, or mixtures thereof. More preferred non-polar liquids include halocarbons, hydrocarbons, halogenated hydrocarbons, or mixtures thereof. For further explanation of what is meant by "polar" and "non-polar" liquids, see supra, this section. See also De Vellis et al. (U.S. Pat. No. 4,846,977), hereinbefore incorporated by reference.

De Vellis et al. disclose a similar method and device for separating one or more polar liquids from one or more non-polar liquids. However, De Vellis et al. do not disclose a method for separating such liquids wherein a surface of a sulfonated fluoropolymer article has a packing means positioned thereon. It has now been discovered that a pervaporation method may be improved by contacting the liquids with a sulfonated halopolymer surface having a packing means positioned thereon. Surprisingly, increased mixing of the liquids, due to the packing means, further increases permeation of polar liquids through sulfonated halopolymer articles. Thus, when a packing means is used, the pervaporation efficiency is increased and the length of the article needed to remove a given amount of polar liquid is decreased. Although it is preferred to use a permanent, functionally deformed sealing means on the packed sulfonated halopolymer article, other means of sealing the membrane to the device may also be used for this aspect of the invention. Another preferable means of sealing may be to use either a ferrule or a reverse ferrule system to seal the article to the device. An example of a "reverse ferrule" system is described in Upchurch Scientific's "Catalog of Chromatography and Fluid Transfer Fittings (1993)" under the trade designation "SUPER FLANGLESS ™ 2-piece Ferrule System" (part numbers p-250, p-350, p-252, p-251, p-301, and Lt-210).

Typically, the sulfonated halopolymer article is a hollow membrane having an inside surface and an outside surface, the inside surface defining a bore. The packing means may be located on either the inside surface or the outside surface of the hollow membrane as long as the mixture is flowed on, or through, the packing means, and the side opposite that of the surface having a packing means is a surface having a drying means. For example, the inside surface of the hollow membrane may contain the packing means and the outside surface of the hollow membrane may have a drying means positioned thereon. By flowing the mixture through the hollow membrane containing a packing means, radial diffusion of liquids in the mixture is increased, and the polar liquid is permeated through the membrane to the outside surface having a drying means positioned thereon. In contrast, the outside surface of the hollow membrane may have the packing means and the inside surface of the hollow membrane may have the drying means. By flowing the mixture on the packing means of the outside surface, radial diffusion of the liquids is increased, and the polar liquid is permeated through the membrane to the inside surface having a drying means positioned thereon.

Preferable sizes, shapes, and compositions of packing means are disclosed in Stevens et al. (U.S. Pat. No. 4,751,004), and these relevant teachings are incorporated herein by reference. Generally, the packing means should have a composition that is non-swelling and inert to all solvents that may possibly contact the packed membrane. Preferably, the packing means are in the form of glass, generally spherical, particles. When using the packing means in a hollow membrane, the diameter of the packing means is preferably within a range of from about sixty percent to about eighty percent as large as the membrane bore diameter. A possible way of packing the means into the bore of the hollow membrane is by vacuum drawing or injecting the packing means into an end of the membrane.

A drying means may be any means by which the permeated polar liquids are removed from the surface of the sulfonated halopolymer article. Drying means include solids, liquids, vapors, and gases. Examples of such drying means are disclosed in De Vellis et al. (U.S. Pat. No. 4,846,977) and are incorporated herein by reference. See col. 6, lines 37–68. Preferably, the drying means are inert gases, such as nitrogen, and have atmospheric dewpoints lower than −20° C. and more preferably lower than −50° C.

Many advantages over prior art methods and device are offered by this invention. Since sulfonated halopolymer articles may now be permanently deformed by the method of this invention, a hollow membrane may be flanged and butted against a device, using a standard flange fitting, to form a compression fit mechanical seal and an improved permeation device. The seal is not adversely affected by solvents used within the improved device, and the maximum pressure that the improved device can handle is determined by the amount of pressure that the sulfonated halopolymer membrane can withstand and not by the technique used to seal the membrane. The improved device can also be easily disassembled and reassembled in a short period of time. In addition, flowing a mixture comprising at least one polar liquid and at least one non-polar liquid on a surface having a packing means positioned thereon improves the membrane's permeation efficiency.

Illustrative Embodiments of the Invention

The following examples illustrate the invention and should not be interpreted as limiting it in any way.

PFSA tubing is available from Perma Purer Inc., under the trade designation NAFION ™. For the illustrative embodiments of this invention, NAFION ™ 815 X tubing, with a 1 mm outer diameter (o.d.) (catalog #TT-050) is used. A standard flanged fitting for 1 mm tubing is available from Upchurch Scientific (part number p-403), and a flanging tool kit is available from Chromatronix, Inc. (part no. FT-1). Inert glass beads are available from Potters Industries. Inc. (part no. 0230).

Example 1

In order to test the swelling effects of various solvents, forty-four hollow 1 mm o.d. PFSA tubular pieces are squared off by cutting with a knife. Tubular end portions having a length of approximately 4 mm are independently contacted with one of four solvent types: $H_2O$; 50%/50% (by volume) $CH_3CN/H_2O$; 50%/50% $CH_3OH/H_2O$; and 50%/50% $THF/H_2O$. Each 4 mm end portion is allowed to be in contact with the solvent for varying time periods (as set out in Table I) and subsequently measured for percent of swelling. The percentages disclosed in Table I represent the percent of swelling over the original size of the end portion. For example, the measurements suggest a 30% swelling at a time of about two minutes in the 50%/50% $CH_3CN/H_2O$ solvent.

TABLE I

Percent of End Portion Swelling as a Function of Both Time and Solvent Composition

| | Solvent | | | |
|---|---|---|---|---|
| Time (Minutes) | 100% $H_2O$ | 50%/50%* $CH_3CN/H_2O$ | 50%/50%* $MeOH/H_2O$ | 50%/50%* $THF/H_2O$ |
| 0 | 0.0% | 0.0% | 0.0% | 0.0% |
| 2 | 12.5% | 26.3% | 22.2% | 30.0% |
| 4 | 12.5% | 26.3% | 22.2% | 36.4% |
| 6 | 12.5% | 26.3% | 22.2% | 41.7% |
| 9 | 12.5% | 26.3% | 22.2% | 46.2% |
| 12 | 12.5% | 30.0% | 22.2% | 46.2% |

TABLE I-continued

Percent of End Portion Swelling as a Function of Both Time and Solvent Composition

| Time (Minutes) | Solvent | | | |
|---|---|---|---|---|
| | 100% $H_2O$ | 50%/50%* $CH_3CN/H_2O$ | 50%/50%* $MeOH/H_2O$ | 50%/50%* $THF/H_2O$ |
| 15** | 12.5% | 30.0% | 22.2% | 46.2% |

Room Temperature ~ 22° C.
*% based upon solvent volume
**Measurements for time periods of up to 60 minutes produced no discernable change in percent of swelling for any of these solvents

Example 2

A hollow 1 mm o.d. PFSA tube is inserted through the bore of a standard flange fitting and a stainless steel washer which closely matches the o.d. of the 1 mm PFSA tube. As in Example 1, the end of the PFSA tube is squared off by cutting with a knife. A tube end portion of approximately 2 mm is contacted for about 2 minutes with a solvent consisting of 50%/50% $CH_3CN/H_2O$. The effect of the solvent is a swelling of the end portion to about 27% over its original size. The tube is then held so that about 2 mm extends past a tube holder that is supplied with the Chromatronix, Inc., flanging tool kit (part no. FT-1). This extended portion is pressed over a nipple on the flanging tool that is heated to a set temperature of 170° C. After 3 seconds, the tube is removed from the flanging tool and the flanged end is pressed against a flat surface at room temperature (about 23° C.). Finally, the flanged end is dipped in room temperature water for approximately 30 seconds. The resultant flanged PFSA tubing demonstrates characteristics of permanence, flexiblility, and non-brittleness.

Example 3

Six feet (1.83 meters) of tubular 1 mm o.d. PFSA membrane is measured out and one end is flanged as previously described in Example 2. A ¼" (6.35 mm), 28 threads/inch, polypropylene High-Performance Liquid Chromatography (HPLC) fitting is placed over the unflanged end and pulled to the flanged end. Approximately ¼" (6.35 mm) above the HPLC fitting, the tube is pinched (between forefinger and thumb) lightly to narrow the bore diameter so that the membrane can be packed with glass beads. By connecting thick-walled TYGON TM brand vinyl tubing to a vacuum source of ~10-15 torr (~75.006 kPa-112.509 kPa) and to the fitting end of the tuber a vacuum is applied. The unflanged end of the tubing is continually dipped into a vial containing glass beads which had been sieved to a size range between about 600 to 850 micrometers. A quantity of glass beads sufficient to fill approximately 5.0 to 8.0 centimeters (cm) of tubing is sucked up each time into the tubing and then distributed to the crimped end. The PFSA tubing is continuously shaken until the glass beads are packed at the crimped end of the tubing. When about 2.5 to 5.0 cm of the PFSA tubing is left unpacked, the vacuum is removed and the second end of the tubing is flanged as described previously. The flanged, packed tubing is then connected and sealed to a pervaporation device module by wrapping it spirally around a center core in a module like that described in De Vellis et al., col. 14, lines 56–62 (incorporated herein by reference). The module is two inches (5.08 cm) in diameter by four inches (10.16 cm) in length and has a polycarbonate cover with o-rings at each end to seal the exterior of the tubular membrane from the atmosphere.

The pervaporation device (i.e. module containing the packed PFSA tubular membrane) is then pressure tested by connecting the unit to a high performance liquid chromatography (HPLC) pump. If any signs of leaking, glass beads flowing out the exit end of the membrane, or any other signs of fatigue are noted, the problem is corrected appropriately. Once the problem, if any, is corrected, a 6.35 mm (¼ inch) polypropylene fitting is used to connect a solvent line entrance tube of tetrafluoroethylene (TFE, commercially available as TEFLON TM) to a pump and to an entrance opening of the pervaporation device. On the other end of the pervaporation device, another 6.35 mm polypropylene fitting is used to connect the TFE tubing to an exit opening, providing an exit tube.

As described in De Vellis et al. (col. 15, lines 4–9), a dry purge gas is fed through an opening in the pervaporation device to provide a continuous stream of dry purge gas to the outside of the PFSA tube. The purge gas is nitrogen with a dewpoint of less than about −40° C. and flow rate of at least 1000 mL/min. After purging through the pervaporation device, the gas (wetted nitrogen) exits through four exhaust ports at the other end of the device.

The pervaportion device is used in a series of experiments in which a liquid solvent mixture of benzene and water is circulated from a solvent reservoir, down the bore of the packed PFSA tube and back into the solvent reservoir. The solvent is pumped with a positive displacement HPLC pump set at a flow rate of 2.0 mL/min and this flow rate is checked volumetrically. Dried solvent exiting the pervaporation device is connected via the TFE exit tube to a three-way valve. In one position, the solvent sample is recycled back to the solvent reservoir, and in the other position, the sample is directed into a Karl Fischer titration vessel. Samples of the dried solvent are periodically collected after exiting the pervaporation device. Water content of each sample is then determined by Karl Fischer titration using a Metrohm coulometric KF-652 titrator on 4.0 mL of the sample.

At the start of the experiment, the reservoir contains one liter of solvent. The solvent is continuously stirred and recirculated through the pervaporation device at ambient temperature. The total solvent volume is reduced due to both pervaporation and the removal of solvent samples for water analysis.

In this experiment, the water content of benzene is monitored versus time at a solvent (benzene and water) flow rate of 2.0 mL/min. The permeation rate of water removed by the packed PFSA tube pervaporation device is calculated. The results from the experiment are provided in Table II. Table II gives purge gas ($N_2$) flow rate in mL/min., reservoir volumes in mL, and water concentrations in part per million (by weight) at the start and end of the experiment.

TABLE II

Permeation Rate of Water As A Function of Water Concentration in Benzene

| Starting Volume (mL) | Starting $H_2O$ (ppm) | Total $H_2O$ (mg $H_2O$) | End Volume (mL) | End $H_2O$ (ppm) | Total $H_2O$ (mg $H_2O$) | Elapsed Time (min) | Permeation Rate (mg/min) |
|---|---|---|---|---|---|---|---|
| 1000 | 154.0 | 134.75 | 960 | 129.0 | 108.36 | 140 | 0.1890 |

TABLE II-continued

Permeation Rate of Water As A Function of Water Concentration in Benzene

| Starting Volume (mL) | Starting $H_2O$ (ppm) | Total $H_2O$ (mg $H_2O$) | End Volume (mL) | End $H_2O$ (ppm) | Total $H_2O$ (mg $H_2O$) | Elapsed Time (min) | Permeation Rate (mg/min) |
| --- | --- | --- | --- | --- | --- | --- | --- |
| 960 | 129.0 | 108.36 | 938 | 118.0 | 96.85 | 80 | 0.1440 |
| 938 | 118.0 | 96.85 | 922 | 80.0 | 64.54 | 230 | 0.1410 |
| 922 | 80.0 | 64.54 | 906 | 29.3 | 23.23 | 720 | 0.0570 |
| 906 | 29.3 | 23.23 | 870 | 23.0 | 17.51 | 160 | 0.0360 |
| 870 | 23.0 | 17.51 | 844 | 14.2 | 10.49 | 255 | 0.0275 |
| 844 | 14.2 | 10.49 | 804 | 4.6 | 3.24 | 5340 | 0.0014 |

Table II demonstrates that the permeation rate of water through the packed PFSA tube depends on the water concentration in the feed solvent. The higher the water concentration in the feed, the higher the permeation rate of water through the membrane. The permeation rate of water varies from 0.19 mg/mL for benzene containing 154 parts per million (ppm) water to a rate of 0.0014 mg/mL for benzene containing 14 ppm water. It takes significantly longer to remove the last traces of water from organic solvents. However, as demonstrated, the packed PFSA tube pervaporation device is capable of removing water from the benzene to very low levels.

Example 4

The packed PFSA tube pervaporation device of Example 3 is prepared with the exception that an 18 inch (45.72 cm) PFSA tube is used rather than the longer six foot (1.83 meter) tube of Example 3. In contrast to the device of Example 3, solvent is not circulated back to the reservoir. Instead, dried solvent coming from the pervaporation device into the three-way valve is, in one position, diverted to a waste vessel, and in the other position, diverted for Karl Fischer sample titration. Samples of dried solvent are taken periodically after exiting the pervaporation device and the water content is determined on a 4.00 mL sample, as described in Example 3.

This device is used in a series of separate experiments in which either toluene or hexane, each containing various amounts of water, is pumped at various rates from a reservoir, down the bore of the packed PFSA tube. The solvents and dry purge gas are pumped as described in Example 3. The purge gas is maintained at a flow rate of greater than 1000 mL/min, the solvent flow rate is adjusted to either 1 mL/min or 2.6 mL/min, and the water concentration in the hexane or toluene solvent is measured before and after drying in the pervaporation device to determine the amount of water removed in a single pass through the device.

Table III gives solvent flow rate in mL/min, purge gas ($N_2$) flow rate in mL/min and water concentrations in ppm (by weight) before and after passing through the pervaporation device.

TABLE III

Percent of Water Removal in 18 Inch (45.72 cm) Packed Tube

| Solvent Type | Solvent Flow Rate (mL/min) | Starting $H_2O$ conc. (ppm) | End $H_2O$ conc. (ppm) | % $H_2O$ Removal |
| --- | --- | --- | --- | --- |
| Toluene | 2.6 | 485 | 33 | 93.2 |
| Toluene | 2.6 | 408 | 17 | 95.8 |
| Toluene | 2.6 | 352 | 28 | 92.0 |
| Toluene | 1.0 | 408 | 8.4 | 98.0 |
| Hexane | 1.0 | 48 | N.D.# | 97.9 |

N.D. equals not detected, with a detection limit of 1 ppm

Table III demonstrates data measured from one pass through a single, 18 inch (45.72 cm), packed PFSA tube in a pervaporation device for removing water from two different nonpolar solvents. It is apparent from this table that as the flow rate of the solvent is decreased, more of the water is removed from the solvent. Thus, the final water concentration is lower and the effective $H_2O$ removal rate is higher when solvent flow rate is lower. In addition, the table demonstrates that water can be removed down to at least 1 ppm when drying hexane containing a starting $H_2O$ concentration of 48 ppm. Similar results are expected with other purge gases and solvents all of which are described herein.

What is claimed is:

1. A method of permanently deforming a sulfonated halopolymer article comprising:
   (a) contacting at least a portion of the article with a solvent to swell at least that portion and thereby form a swelled article;
   (b) deforming at least a part of the swelled portion to form a temporarily deformed article; and
   (c) heating the swelled portion of the temporarily deformed article at a temperature within a range of from about 100° C. to about 220° C. for a time sufficient to convert the temporarily deformed article to a permanently deformed article.

2. The method of claim 1 wherein the solvent is selected from a group consisting of water, methanol, ethanol, acetonitrile, tetrahydrofuran, and mixtures thereof.

3. The method of claim 1, further comprising cooling at least the heated portion of the permanently deformed article.

4. The method of claim 1, further comprising immersing at least a portion of the permanently deformed article in water so that the flexibility of that portion is enhanced.

5. The method of claim 1 wherein the article is a hollow membrane and the permanent deformation is a flange formed on at least one end of the membrane.

6. The method of claim 1 wherein the sulfonated halopolymer article is a polymer comprising compounds represented by the general formula:

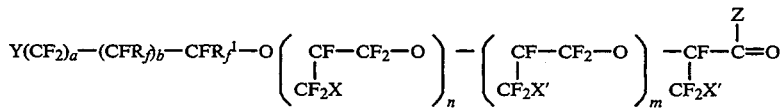

where
- a = an integer from, and including, 0 to 3;
- b = an integer from, and including, 0 to 3;
- m = an integer from, and including, 0 to 6;
- n = an integer from, and including, 0 to 6;
- $R_f$ and $R_f^1$ are each independently selected from the group consisting of F, Cl, perfluoroalkyl and fluorochloroaklyl;
- X = F, Cl, Br, or mixtures thereof when n > 1;
- X' = Cl, Br, or mixtures thereof;
- Y is selected from the group consisting of

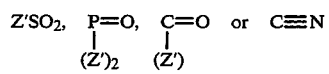

- Z' is F, Cl, Br, OH, NRR' or OA;
- R and R' are independently selected from the group consisting of hydrogen, an alkyl having one or more than one carbon atom and an aryl;
- Z = F, Cl, Br, OH, NRR' or OA;
- R and R' are independently selected from the group consisting of hydrogen, an alkyl having one or more carbon atom and aryl;
- A = alkali metal, quarterary ammonium or R.

7. The method of claim 1 wherein the sulfonated halopolymer article is a sulfonated fluoropolymer article.

8. The method of claim 7 wherein the sulfonated fluoropolymer article is a sulfonated perfluoropolymer.

9. The sulfonated halopolymer article made by the process of claim 1, wherein the article is a hollow membrane and the permanent deformation is shaped as a flange.

10. The article of claim 9 wherein the hollow membrane has a packing material positioned therein.

11. A method for separating at least one polar liquid from a mixture of polar and non-polar liquids wherein the mixture is placed in contact with the packing material in claim 10.

* * * * *